United States Patent [19]

Yanagihara

[11] Patent Number: 5,095,394
[45] Date of Patent: Mar. 10, 1992

[54] TRACKING METHOD FOR DIGITAL SIGNAL REPRODUCING APPARATUS

[75] Inventor: Naofumi Yanagihara, Tokyo, Japan
[73] Assignee: Sony Corporation, Tokyo, Japan
[21] Appl. No.: 467,526
[22] Filed: Jan. 19, 1990
[30] Foreign Application Priority Data Jan. 24, 1989 [JP]  Japan .................................. 1-14854

[51] Int. Cl.⁵ ............................................ G11B 5/584
[52] U.S. Cl. ............................................... 360/77.140
[58] Field of Search .................... 360/77.14, 77.15, 70

[56] References Cited

U.S. PATENT DOCUMENTS 4,528,605  7/1985  Hiraguri ................... 360/77.140
5,003,413  3/1991  Miyazaki .................. 360/77.140

Primary Examiner—Aristotelis Psitos
Assistant Examiner—David L. Robertson
Attorney, Agent, or Firm—Alvin Sinderbrand; William S. Frommer

[57] ABSTRACT

Tracking control signals are produced in response to the scanning of data tracks on a record medium, with at least alternate ones of those tracks containing tracking information signals recorded in predetermined areas. The tracks are scanned by a transducer arrangement comprised of first and second heads offset from each other in a direction substantially transverse of the tracks and displaced from each other in a direction substantially parallel to those tracks, such that the first and second heads scan two tracks concurrently over the major portion of a scanning trace of each head. Tracking information signals picked up by the first and second heads during a scanning trace are detected; and a tracking control signal indicative of a tracking error relative to the tracks being scanned is produced in response to those tracking information signals picked up by the two heads.

28 Claims, 11 Drawing Sheets

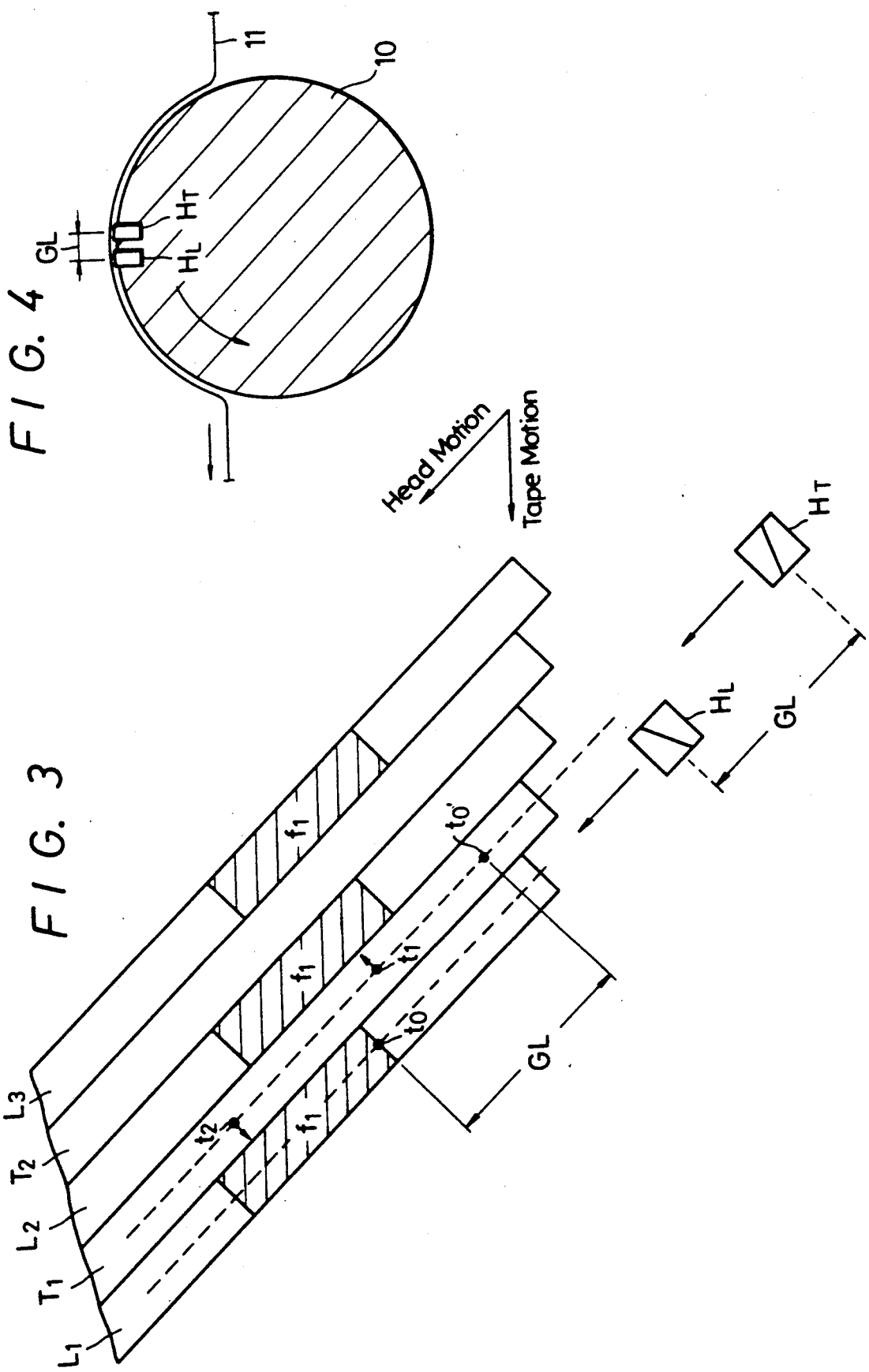

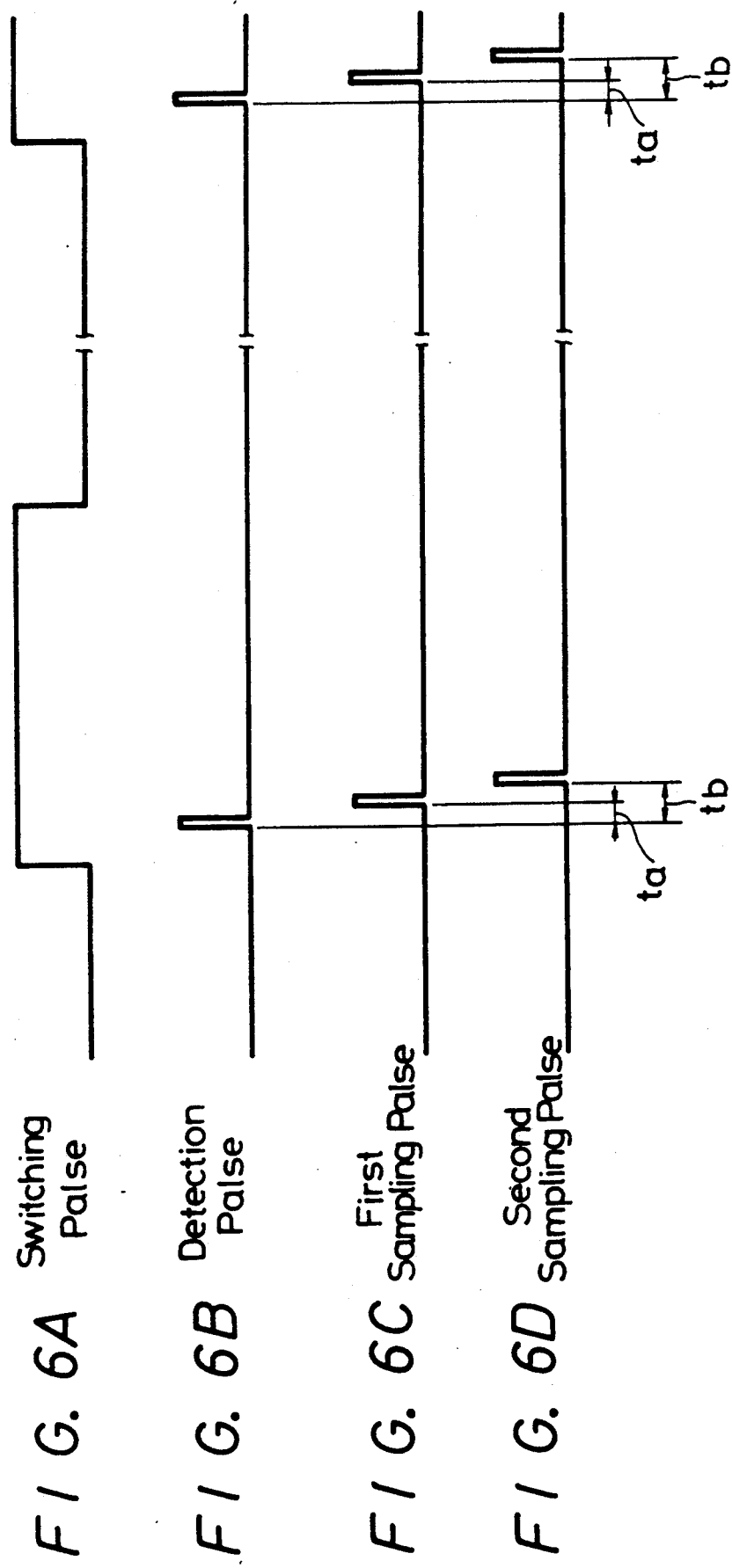

TRACKING METHOD FOR DIGITAL SIGNAL REPRODUCING APPARATUS

BACKGROUND OF THE INVENTION

1. Field of the Invention

This invention relates to tracking control arrangements and, more particularly, to such arrangements having particular application in reproducing digital signals recorded in substantially parallel tracks with improved tracking control over the heads used to reproduce those digital signals. The invention is especially useful in digital audio tape (DAT) and in video signal reproduction.

2. Description of the Prior Art

Tracking control techniques have long been known to position one or more transducers, namely, playback heads, properly over data tracks from which previously recorded signals are reproduced. Such tracking control techniques are used in servo control circuitry for digital mass storage devices, such as magnetic disk drives, video record/reproduce devices (referred to typically as video tape recorders) and in recently introduced digital audio record/reproduce systems, such as digital audio tape (DAT) recorders. In VTR and DAT devices, video or audio information is recorded in parallel slant tracks across a magnetic tape by a helical-scan rotary device. Preferably, digital codes are used to represent the video and audio information, such as pulse code modulated (PCM) signals. It is appreciated that PCM recording provides low loss, high quality signal reproduction.

In a typical tracking control arrangement used with rotary heads (the principal of which also finds ready application in fixed head devices, such as mass storage devices), a control signal is recorded when the useful information (i.e. the digital signals representing video or audio information) is recorded; and this control signal, when played back, is used to determine any deviation of the position of the playback head from the center of the track being scanned thereby. For example, in one prior art embodiment, the control signal is recorded by a stationary control head along a longitudinal edge of the magnetic tape on which the slant tracks of digital signals are recorded. The rotary phase of the scanning heads is compared to the phase of the reproduced control signal; and any phase differential therebetween is used to adjust the position of the heads relative to the scanned tracks.

As VTR and DAT systems became miniaturized, constraints on size and volume increased, making it desirable to eliminate various mechanical elements. The stationary control head, whose primary function was to reproduce pre-recorded control signals, thus became surplusage. Accordingly, it has been proposed in Japanese Laid Open Patent Application No. 59-112406 to provide a tracking control technique which does not rely on the aforementioned stationary control head. In that proposal, the rotary transducer arrangement is used to sense tracking errors.

The inherent ability of a PCM signal to be processed, such as to be timebase compressed, time division multiplexed, etc., allows various control signals to be recorded in the same track as the PCM signal but without interfering therewith. Such non-interfering combination of different types of signals is not readily available or easily attained when the information is recorded in analog form. Notably, a PCM signal need not be recorded or reproduced continuously but, rather, samples may be recorded in spaced apart locations, thereby facilitating the interspersing of other controlling information therewith. Thus, tracking control for VTR and DAT systems can be obtained by recording tracking information signals in the same track, but at different discrete areas, as the PCM signals.

In one prior art technique in which tracking information signals are recorded in the same tracks as PCM signals, plural rotary heads are angularly spaced on a drum, with each head scanning a single track such that one track at a time is recorded or reproduced. PCM signals are recorded in a relatively long data area which occupies the center portion of a track, and the tracking information signals are recorded in leading and lagging positions relative to the data area. In a simplified form, the tracking information signal comprises a pilot signal and, in addition, a synchronizing signal also is recorded in each track and spaced from a respective pilot signal. Thus, in one track a synchronizing signal may be recorded, followed by a pilot signal, followed by the data area, followed by another pilot signal which, in turn, is followed by yet another synchronizing signal. In an adjacent track, a pilot signal may be recorded, followed by a synchronizing signal, followed by the data area, followed by another synchronizing signal which, in turn, is followed by yet another pilot signal. During a recording operation, each head used to record PCM, pilot and synchronizing signals exhibits a width which is wider than the resultant track. Thus, a successive track slightly overlaps a preceding track such that the tracks are adjacent one another without the provision of guard bands. The recording of a later track tends to "over record" a narrow longitudinal portion of a preceding track.

As is known when recording tracks of high density, adjacent tracks should be recorded with heads having different azimuths. By reason of the phenomenon known as azimuth loss, a signal of relatively higher frequency recorded with one azimuth will not be picked up to any significant degree as cross talk when an adjacent track is scanned by a head of different azimuth. However, signals of relatively lower frequency do not exhibit azimuth loss and, thus, will be picked up as cross talk. Thus, when a head of, for example, azimuth A scans a track recorded previously by a head of the same azimuth A, any low frequency pilot signal in an adjacent track recorded with azimuth B will, nevertheless, be picked up as cross talk. The amplitude of this cross talk pilot signal component is a function of the tracking error of the head relative to the track which it is scanning. Based upon this tracking error, remedial efforts are made to return the head to its proper tracking position, such as aligned with the center of the track, as by increasing or decreasing the tape speed which results in a realignment of the head relative to the track.

Whereas the pilot signal is recorded with a relatively low frequency to minimize azimuth loss and thus permit cross talk to be detected, a synchronizing signal is recorded at a relatively high frequency such that when the synchronizing signal in an adjacent track is picked up, azimuth loss attenuates its amplitude. Of course, the synchronizing signal recorded in a given track is reproduced by the head which scans that track. By judiciously recording the pilot and synchronizing signals at discrete times in each track, the resultant track pattern has a synchronizing signal in one track adjacent the pilot signal in an adjacent track. Thus, when a given track is scanned, at the time that the synchronizing signal in that track is reproduced, tracking control circuitry may be triggered to detect any cross talk pilot signal that is picked up from an adjacent track. For example, when the head of azimuth A senses the synchronizing signal which had been recorded with azimuth A previously, the tracking control circuitry is triggered to sense any pilot signal which had been recorded in an adjacent track with azimuth B and which now may be picked up as cross talk by this head. Of course, any synchronizing signal which had been recorded in the adjacent track with azimuth B will not be picked up as cross talk by the scanning head of azimuth A by reason of the aforementioned azimuth loss phenomenon.

However, the aforementioned technique of recording relatively low frequency pilot signals and higher frequency synchronizing signals in discrete locations in each track such that the synchronizing signal in one track is positioned opposite the pilot signal in an adjacent track results in a relatively complicated recording scheme. The recording of signals of substantially different frequencies to take advantage of the azimuth loss phenomenon adds to this complexity.

OBJECTS AND SUMMARY OF THE INVENTION

Therefore, it is an object of the present invention to provide an improved tracking error detection technique which overcomes the aforementioned drawbacks and disadvantages of prior proposals.

Another object of this invention is to provide a technique for producing tracking control signals wherein tracking information is recorded relatively simply in at least some (but not necessarily all) of the data tracks.

A further object of this invention is to provide a technique wherein the same tracking information signal which is recorded in at least alternate tracks is used both as a timing signal and as a tracking error signal as those tracks are scanned.

An additional object of this invention is to provide an improved technique of the aforementioned type in which two heads are used to scan two adjacent tracks concurrently over substantially the major portion of each track for the propose of detecting tracking errors of those heads.

Yet another object of this invention is to provide a technique of the aforementioned type which uses a relatively simple pattern of tracking information signals for determining tracking errors.

A still further object of this invention is to provide a technique of the aforementioned type in which cross talk signals picked up from tracks on opposite sides of a track being scanned are used to determine tracking errors.

Various other objects, advantages and features of the present invention will become readily apparent from the ensuing detailed description, and the novel features will be particularly pointed out in the claims.

In accordance with this invention, tracking control signals are produced in response to the scanning of data tracks on a record medium, at least alternate ones of those tracks containing tracking information signals recorded in predetermined areas. The tracks are scanned with first and second heads offset from each other in a direction substantially transverse of the tracks and displaced from each other in a direction substantially parallel to the tracks such that the two heads scan two tracks concurrently over the major portion of a scanning trace of each head. In a described embodiment, the heads are mounted on a rotary drum which scans slant tracks across a magnetic tape. The level of tracking information signals picked up by one of the heads is sensed at times established by the tracking information signals picked up by the other head; and a tracking control signal is produced in response to the sensed tracking information signal level.

As one feature of this invention, the tracking information signal picked up by the aforementioned one head from one adjacent track is compared to the tracking information signal picked up by that same head, but at a later time, from the other adjacent track. The difference between the compared tracking information signal levels determines the tracking error of the heads. As one aspect of this feature, the times at which the tracking information signals are sensed, or the times at which the level differences therebetween are sensed, is determined by predetermined time delays following the detection of a tracking information signal picked up by the aforementioned other head. As another aspect of this feature, synchronizing signals are recorded in at least those tracks in which tracking information signals are recorded; and the times at which the picked up tracking information signal levels are compared are referenced to the sensing of the synchronizing signals by the aforementioned other head. As yet another aspect of this invention, the aforementioned synchronizing signals are recorded in alternate ones of those tracks which do not contain tracking information signals, and the times at which the sensed tracking information signals are compared are referenced to the times at which the synchronizing signals are detected.

BRIEF DESCRIPTION OF THE DRAWINGS

The following detailed description, given by way of example, and not intended to limit the present invention solely thereto, will best be appreciated from the accompanying drawings in which:

FIG. 3 is a schematic representation of one embodiment of a track pattern which is used by the present invention to detect tracking errors;

FIG. 4 is a schematic representation of a rotary head arrangement used to scan the track pattern shown in FIG. 3;

FIGS. 6A-6D are timing waveforms which are useful in understanding the operation of the circuit shown in FIG. 5;

DETAILED DESCRIPTION OF CERTAIN PREFERRED EMBODIMENTS

Figure 2:
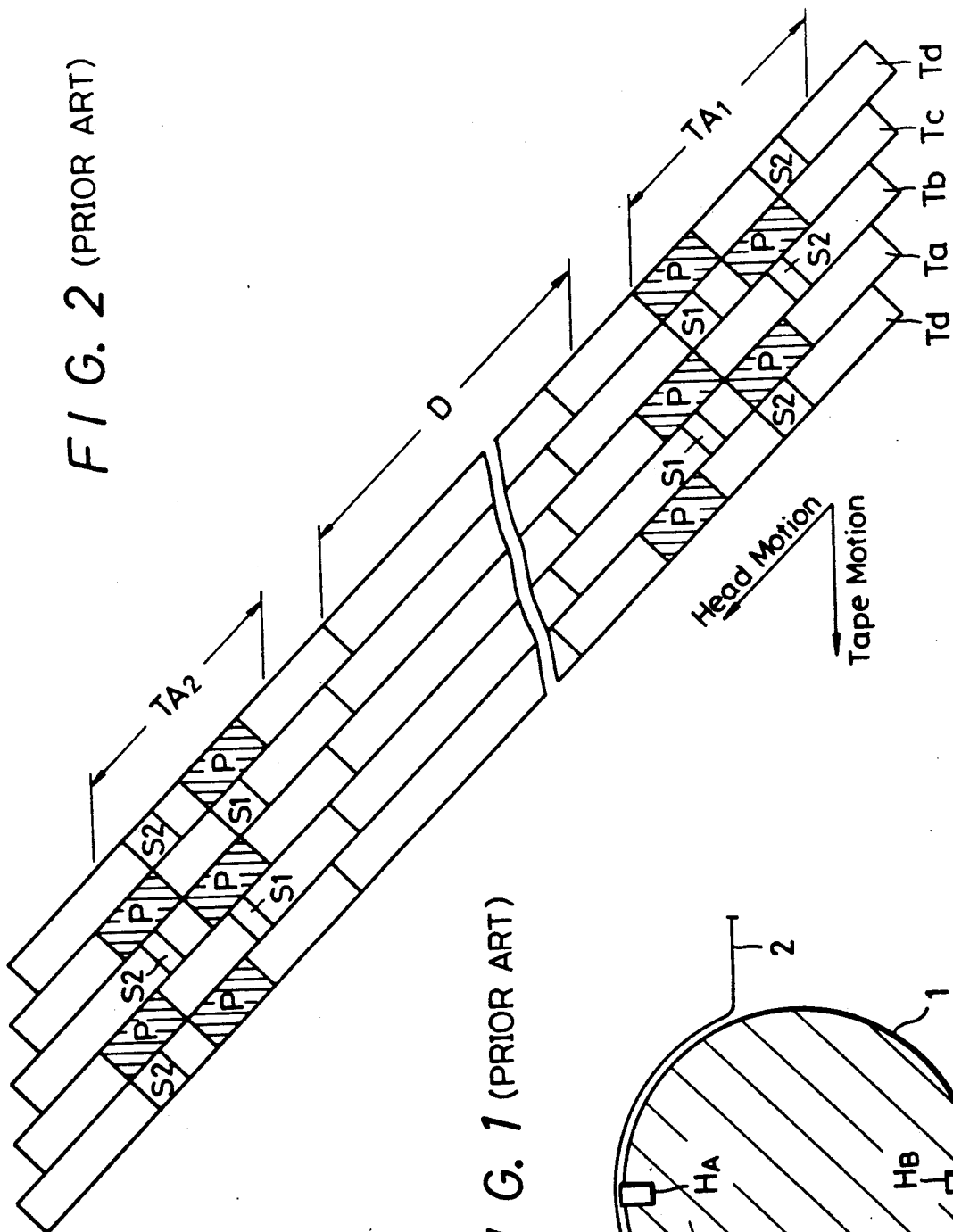
FIG. 2 is a schematic representation of a track pattern used by the prior art to detect tracking errors.
Figure 1:
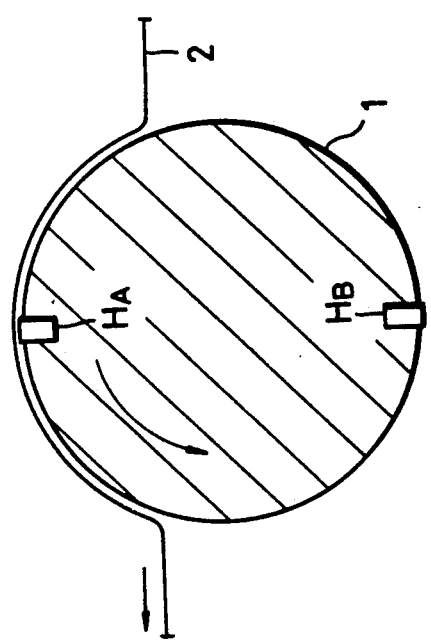
FIG. 1 is a schematic representation of a prior art rotary head arrangement for scanning slant tracks across a magnetic tape.

Before describing embodiments of the present invention, reference is made to FIGS. 1 and 2 which illustrate a prior art rotary head arrangement and track pattern scanned thereby for sensing tracking errors when data tracks are scanned by those rotary heads. Let it be assumed that heads $H_A$ and $H_B$ exhibit different azimuths which, for convenience, are identified as azimuths A and B, respectively. Heads $H_A$ and $H_B$ are mounted on a rotary drum 1 which helically scans a magnetic tape 2, the latter being transported in the illustrated direction. Heads $H_A$ and $H_B$ are spaced 180° apart; and tape 2 is wrapped about a peripheral portion of drum 1 to extend over an angle of 90°. That is, when drum 1 rotates by 90°, head $H_A$ scans substantially a full track across the tape wrapped about the drum.

The width (or gap-length) of each of heads $H_A$ and $H_B$ is greater than the width of the track which eventually is formed on tape 2. Thus, during recording, a portion of the track which was recorded by head $H_A$ is overrecorded by head $H_B$. Consequently, when these tracks are reproduced, each head extends across the track being scanned thereby to an adjacent track which had been recorded by the other head.

During a recording operation, digital signals, pilot signals and synchronizing signals are supplied to each head at predetermined times, that is, when the head reaches particular locations on the track being traced thereby, resulting in the track pattern shown in FIG. 2. Digital data is recorded in the major portion of each track, illustrated in FIG. 2 as data area D. A tracking area $TA_1$ is recorded in leading relation to each data area D, and a tracking area $TA_2$ is recorded in lagging relation to the data area, as is also shown. A particular repetitive cycle of track patterns is comprised of track $T_a$, followed by track $T_b$, followed by track $T_c$ and followed by track $T_d$. This cycle of four tracks $T_a$–$T_d$ then repeats. For example, in track $T_a$, pilot signal P is recorded in tracking area $TA_1$, followed by a synchronizing signal $S_1$; and in tracking area $TA_2$, synchronizing signal $S_1$ is recorded, followed by pilot signal P. As illustrated, the pilot signal P is longitudinally spaced from the synchronizing signal $S_1$, for a reason soon to be described.

In adjacent track $T_b$, a synchronizing signal $S_2$ followed by the pilot signal P is recorded in tracking area $TA_1$; and the pilot signal P followed by the synchronizing signal $S_2$ is recorded in tracking area $TA_2$. Here too, the synchronizing signal $S_2$ is longitudinally spaced from the pilot signal P.

Similarly, in track $T_c$, pilot signal P followed by the synchronizing signal $S_1$ is recorded in tracking area $TA_1$; and the synchronizing signal $S_1$ followed by the pilot signal P is recorded in tracking area $TA_2$. Here too, the pilot and synchronizing signals are longitudinally spaced from each other in each tracking area. Finally, in track $T_d$, the synchronizing signal $S_2$ is followed by the pilot signal P in tracking area $TA_1$; and the pilot signal P followed by the synchronizing signal $S_2$ is recorded in tracking area $TA_2$. It is seen that the synchronizing and pilot signals recorded in each tracking area are longitudinally spaced from each other.

In the example illustrated in FIG. 2, the pilot signal P exhibits a relatively low frequency such that it is not subject to significant azimuth loss. Hence, if head $H_A$ records track $T_a$ and track $T_c$, and if head $H_B$ records track $T_b$ and track $T_d$, when head $H_A$ scans track $T_a$, it is expected that the pilot signal P recorded in tracks $T_b$ and $T_d$, both adjacent track $T_a$, will be picked up as cross talk. However, the synchronizing signals $S_1$ and $S_2$ exhibit relatively higher frequency and, thus, are subject to azimuth loss. Consequently, when head $H_A$ scans track $T_a$, it is expected that synchronizing signals $S_2$ recorded in adjacent tracks $T_b$ and $T_d$ will be picked up but will be significantly attenuated. Hence, cross talk synchronizing signals are, for all practical purposes, minimal.

In the track pattern illustrated in FIG. 2, each pilot signal P is recorded in a substantially equal area from track to track; but the synchronizing signals are recorded in areas of different lengths from one track to the next. For example, the synchronizing signals $S_1$ and $S_2$ are recorded in substantially equal but relatively small areas in tracks $T_a$ and $T_b$, respectively; whereas these synchronizing signals are recorded in substantially equal but larger areas in tracks $T_c$ and $T_d$. Furthermore, the synchronizing signal in one track is recorded in a position such that it is opposite the pilot signal P in the next adjacent track. Thus, in both tracking areas $TA_1$ and $TA_2$, synchronizing signal $S_1$ in track $T_a$ is adjacent pilot signal P in track $T_b$; synchronizing signal $S_2$ in track $T_b$ is adjacent pilot signal P in track $T_c$; synchronizing signal $S_1$ in track $T_c$ is adjacent pilot signal P in track $T_d$; and synchronizing signal $S_2$ in track $T_d$ is adjacent pilot signal P in track $T_a$. It is appreciated that relatively complex circuitry must be used to generate the pilot and synchronizing signals of three different frequencies (it is assumed that synchronizing signals $S_1$ and $S_2$ exhibit different frequencies); and an accurate timing arrangement must be maintained to assure the positioning of the synchronizing signals relative to the adjacent pilot signals when recording the illustrated track pattern.

To sense tracking errors, let it be assumed that head $H_A$ scans track $T_a$ during a reproduction (or read) operation. Now, when head $H_A$ reproduces synchronizing signal $S_1$, detecting circuitry (not shown) is enabled to detect the cross talk pilot signal P picked up from an adjacent track. It is seen from the track pattern shown in FIG. 2 that at the time synchronizing signal $S_1$ is read, pilot signal P in adjacent track $T_b$ may be picked up as cross talk; and if the pilot signal is detected at this time, the level of the detected pilot signal is a function of the overlap of head $H_A$ on adjacent track $T_b$. If this cross talk pilot signal level P is too low, it is concluded that head $H_A$ is offset to the left of center of track $T_a$.

However, if the cross talk pilot signal level is too great, it is concluded that head $H_A$ is offset to the right of center of track $T_a$. A similar operation is carried out when tracks $T_b$, $T_c$ and $T_d$ are scanned.

At a predetermined time following the detection of synchronizing signal $S_1$, the pilot signal detecting circuitry may be enabled once again to detect any pilot signal cross talk that may be picked up from the other adjacent track $T_d$. Likewise, the cross talk pilot signal picked up from track $T_a$ may be detected at a predetermined time following the sensing of synchronizing signal $S_2$ by head $H_B$ when track $T_b$ is scanned. Thus, by using the sensing of the synchronizing signal as a reference, cross talk pilot signals picked up from one and then the other adjacent tracks may be detected. Tracking errors may be determined by comparing the cross talk pilot signals picked up from tracks $T_b$ and $T_d$ when track $T_a$ is scanned, by comparing the cross talk pilot signals picked up from tracks $T_c$ and $T_a$ when track $T_b$ is scanned, by comparing the cross talk pilot signals picked up from tracks $T_d$ and $T_b$ when track $T_c$ is scanned, and so on. The determined tracking error then may be applied to a servo circuit or other capstan motor control to regulate the speed at which tape 2 is transported, thereby returning head $H_A$ (and head $H_B$) to the center of the track being scanned thereby so as to correct tracking errors.

Turning now to FIG. 3, there is illustrated one embodiment of a track pattern which is sensed by the rotary heads illustrated in FIG. 4 to reproduce digital signals from the respective tracks with minimal tracking error. In the preferred embodiment shown in FIG. 4, heads $H_L$ and $H_T$ are mounted on rotary drum 10 in a manner such that they are offset from each other in a direction parallel to the rotary axis of the drum and also are angularly displaced from each other. In this configuration, head $H_L$ moves into contact with tape 11 in advance of head $H_T$ and, thus, head $H_L$ is referred to as the leading head and head $H_T$ is referred to as the trailing head. FIG. 3 illustrates the relationship of the leading and trailing heads to each other and to the tape. The offset of the leading and trailing heads is seen to be approximately equal to a track pitch and in a direction transverse of the tracks, and the angular displacement GL of the heads is seen to be in a direction parallel to the tracks. By reason of the offset and angular displacement thereof, the leading and trailing heads scan two tracks concurrently over the major portion of a scanning trace of each. For convenience, the track scanned by leading head $H_L$ is referred to as a leading track L and the track scanned by trailing head $H_T$ is referred to as a trailing track T. As was true in the prior art embodiment of FIGS. 1 and 2, tape 11 is wrapped about a peripheral surface of drum 10 over an angular extent of, for example, 90°. Thus, as drum 10 rotates by 90°, head $H_L$ (or head $H_T$) scans a track across tape 11.

The fact that heads $H_L$ and $H_T$ are closely spaced so as to be offset by an amount substantially equal to the pitch of the record tracks and angularly displaced by a relatively small amount GL results in better track linearity than when the heads are mounted oppositely of each other, spaced apart by 180°, as shown in FIG. 1. It is appreciated that if the drum of FIG. 1 does not rotate with precise uniformity, the track recorded or reproduced by one head, such as head $H_A$, may differ in its alignment from and relative to the track formed by the other head $H_B$. However, when the two heads are mounted close to each other, as are heads $H_L$ and $H_T$ in FIG. 4, any nonuniformity in the rotation of drum 10 will result in an alignment of one track, such as the track recorded or reproduced by head $H_L$, substantially equal to the alignment of the other track. It is recognized that there is a greater likelihood for one half rotation of the drum to differ from the next half rotation thereof. But, if the heads are closely spaced, as in the FIG. 4 embodiment, any change in the rotation of the drum will have substantially equal effects on the tracks formed by both heads. Thus, the alignments of the tracks will be maintained relative to each other even if the drum undergoes changes in its rotational characteristics.

It is possible that the angular displacement GL of the leading and trailing heads $H_L$ and $H_T$ may differ from one drum to another. To account for such possible irregularities in the displacement of the heads, a time delay may be introduced in the signal produced by trailing head $H_T$ to compensate for differences in angular displacement. For example, if the angular displacement is less than a particular standard, this time delay may be increased. Conversely, if the angular displacement is greater than the standard, the time delay may be reduced. Such time delay adjustment may be carried out during the test phase of the manufacturing operation, as when a prerecorded reference tape having reference signals recorded in adjacent tracks with precise timing is reproduced by heads $H_L$ and $H_T$, and the time delay of the signals reproduced by these heads is compared to a reference time differential. Any differences between the measured time delays and the reference time differential as may be caused by manufacturing tolerances in the angular displacement GL then may be compensated by adjusting the time delay imparted to the respective playback channels of heads $H_L$ and $H_T$. Thus, mechanical irregularities may be corrected by electronic adjustments.

During a recording operation, the track pattern illustrated in FIG. 3 is formed. A tracking information signal, such as a pilot signal of frequency $f_1$, is recorded by leading head $H_L$ in leading tracks $L_1$, $L_2$, $L_3$ and so on. No tracking information signals are recorded in trailing tracks $T_1$, $T_2$, etc., which are recorded by trailing head $H_T$. As illustrated, the tracking information signal is recorded in a predetermined area in advance of a data area (not shown) in which the digital signals are recorded; and the tracking information area preferably is disposed at the leading portion of each track. As will be described below, the tracking information signal may be recorded in leading position as well as lagging position relative to the data area.

Preferably, the tracking information signal is of a frequency that is not substantially attenuated by azimuth loss. Thus, when trailing track $T_1$ is scanned by trailing head $H_T$, cross talk components of tracking information signals are produced thereby when adjacent track $L_1$ or adjacent track $L_2$ is scanned. As an example, the tracking information signal may be a pilot signal whose frequency $f_1$ is within the range of several hundred KHz to several MHz. In the preferred embodiment, the tracking information signal is recorded in alternate tracks, such as the leading tracks $L_1$, $L_2$, etc. in substantially the same position in each such track.

The manner in which the tracking information signal pattern recorded in FIG. 3 is detected and used to indicate tracking errors now will be described in conjunction with the tracking control signal producing circuit shown in FIG. 5. In the FIG. 5 embodiment, the tracking information signal picked up by leading head $H_L$ is used to produce sampling signals at first and second predetermined times; and the level of the tracking information signal picked up by trailing head $H_T$ at those predetermined times is sensed. Accordingly, leading head $H_L$ is coupled to a frequency detector 23 by way of an amplifier 21 and a bandpass filter 22, the latter being tuned to pass the frequency of the pilot signal. Frequency detector 23 is adapted to detect the pilot signal and to produce a relatively narrow pulse in response thereto. First and second delay circuits 24 and 25 exhibit different time delays $t_a$ and $t_b$ and are coupled to frequency detector 23 to delay the pulse produced by the frequency detector. These delayed pulses are used as sampling pulses.

Trailing head $H_T$ is coupled to an envelope detector 33 by way of an amplifier 31 and a bandpass filter 32, the latter being tuned to pass the frequency $f_1$ of the pilot signal. Envelope detector 33 is adapted to produce a signal whose amplitude is determined by the level of the pilot signal passed by bandpass filter 32. The output of envelope detector 33 is coupled to a sample-and-hold circuit 34 which is supplied with a sampling pulse produced by delay circuit 24. The sampled pilot signal level produced by sample-and-hold circuit 34 is coupled to one input of a comparator 35, the other input thereof being connected directly to the output of envelope detector 33. Comparator 35 may be constructed as a difference amplifier whose output is coupled to yet another sample-and-hold circuit 36, this circuit being supplied with the sampling pulse produced by delay circuit 25. The output of sample-and-hold circuit 36 is coupled to an output terminal 37 as a tracking control signal.

In operation, let it be assumed that leading head $H_L$ scans track $L_1$ as trailing head H scans trailing track $T_1$. FIG. 6A represents a switching pulse that defines the period during which heads $H_L$ and $H_T$ scan tracks $L_1$ and $T_1$ and are enabled to reproduce signals from tape 11. Head $H_L$ senses the tracking information signal recorded in track $L_1$ when the head arrives at the position represented by the black dot $t_0$ shown in FIG. 3. At that time, since head $H_T$ trails head $H_L$ by the displacement GL, head $H_T$ is at position $t'_0$ in track $T_1$. At position $t_0$ when head $H_L$ senses the tracking information signal recorded in track $L_1$, frequency detector 23 generates the detection pulse shown in FIG. 6B. This detection pulse is delayed by the time delay $t_a$ in delay circuit 24 to produce the sampling pulse shown in FIG. 6C. The detection pulse also is delayed by the time delay $t_b$ in delay circuit 25 to produce the sampling pulse shown in FIG. 6D.

At the delayed time $t_a$ at which the sampling pulse shown in FIG. 6C is produced, head $H_T$ advances from the position represented by $t'_0$ to the position represented by $t_1$. It is appreciated that at this position, and for a brief time preceding the arrival at position $t_1$, head $H_T$ picks up as cross talk the tracking information signal recorded in adjacent track $L_2$. At time $t_a$, that is, when head $H_T$ reaches position $t_1$, the sampling pulse produced by delay circuit 24 is used by sample-and-hold circuit 34 to detect the amplitude of this picked up tracking information signal. This sampled cross talk signal is stored and compared by comparator 35 to whatever other output signal levels are produced by trailing heat $H_T$. Thus, as head $H_T$ continues to scan track $T_1$, it is expected that the output of comparator 35 exhibits a fluctuating amplitude. However, this comparator output is not detected, or sampled, until time $t_b$, at which time the sampling pulse shown in FIG. 6D is applied to sample-and-hold circuit 36. Time $t_b$ corresponds to the arrival of trailing head $H_T$ at position $t_2$. At that time, the trailing head picks up tracking information signal recorded in adjacent track $L_1$. Comparator 35 produces an output signal representing the difference between the tracking information signal picked up by head $H_T$ at position $t_1$, that is, the cross talk pilot signal $f_1$ picked up from adjacent track $L_2$, with the tracking information signal picked up by head $H_T$ from adjacent track L when head $H_T$ reaches position $t_2$. Thus, the comparator output at time $t_b$ is sampled by sample-and-hold circuit 36 and supplied as a tracking control signal to output terminal 37.

Assuming that the tracking information signal is recorded with substantially constant amplitude in leading tracks $L_1$, $L_2$, $L_3$ and so on, any difference between the sampled cross talk tracking information signal picked up by trailing head $H_T$ at positions $t_1$ and $t_2$ is representative of the deviation of this head from the center line of the trailing track scanned thereby. If the cross talk tracking information signal picked up at position $t_1$ is greater than that picked up at position $t_2$, heads $H_T$ and $H_L$ are to the right of center of the tracks being scanned. Conversely, if the cross talk tracking information signal picked up at position $t_1$ is less than that picked up at position $t_2$, heads $H_L$ and $H_T$ are displaced to the left of center of their respective tracks. The difference between these cross talk tracking information signals thus is used as a tracking control signal to adjust the movement of tape 11 and thereby restore heads $H_L$ and $H_T$ to the centers of the tracks scanned thereby.

It is seen that the tracking information signal reproduced by head $H_L$ from leading track $L_1$, $L_2$, etc., establishes the times at which the level of the cross talk tracking information signal picked up by trailing head $H_T$ from the two tracks adjacent the trailing track $T_1$ are sensed and compared. This timing, referenced to the sensing of the tracking information signal reproduced by leading head $H_L$, is selected such that head $H_T$ picks up a cross talk tracking information signal from only one adjacent track at a time. That is, at position $t_1$ the tracking information signal is recorded adjacent head $H_T$ in track $L_2$, but not in adjacent track $L_1$. Likewise, at the time that head $H_T$ reaches position $t_2$, the tracking information signal is recorded in adjacent track $L_1$ but not in adjacent track $L_2$. Consequently, at the sampling times established by delay circuits 24 and 25, any tracking information signal which is detected by trailing head $H_T$ is picked up from only one adjacent track. Thus, the relative position, or tracking error, of head $H_T$ relative to that one track may be determined. By comparing to each other the tracking information signal picked up by head $H_T$ at positions $t_1$ and $t_2$, an accurate indication of any tracking error of head $H_T$, as well as a substantially identical tracking error of head $H_L$, is determined.

By using pilot signal $f_1$ as the tracking information signal recorded in alternate tracks, the more complicated pattern shown in FIG. 2 is avoided. The pilot signal $f_1$ serves a dual purpose: the level of the cross talk pilot signal picked up by trailing head $H_T$ is indicative of any tracking error; and when reproduced by head $H_L$, it provides a reference from which proper sampling times may be established to sense the cross talk pilot signal which is picked up at those sampling times by trailing head $H_T$. Thus, a pilot signal having only one frequency $f_1$ need be recorded in alternate tracks, which can be achieved relatively simply and without severe timing constraints as are otherwise apparent from the more complicated track pattern shown in FIG. 2. At the same time, the pilot signal detecting circuit used to sense tracking errors may be relatively simple, as shown in FIG. 5.

As yet another advantage derived from the present invention, since tracking information signals need not be recorded in the trailing tracks, other useful information, such as code signals, may be recorded therein.

Figure 7A:
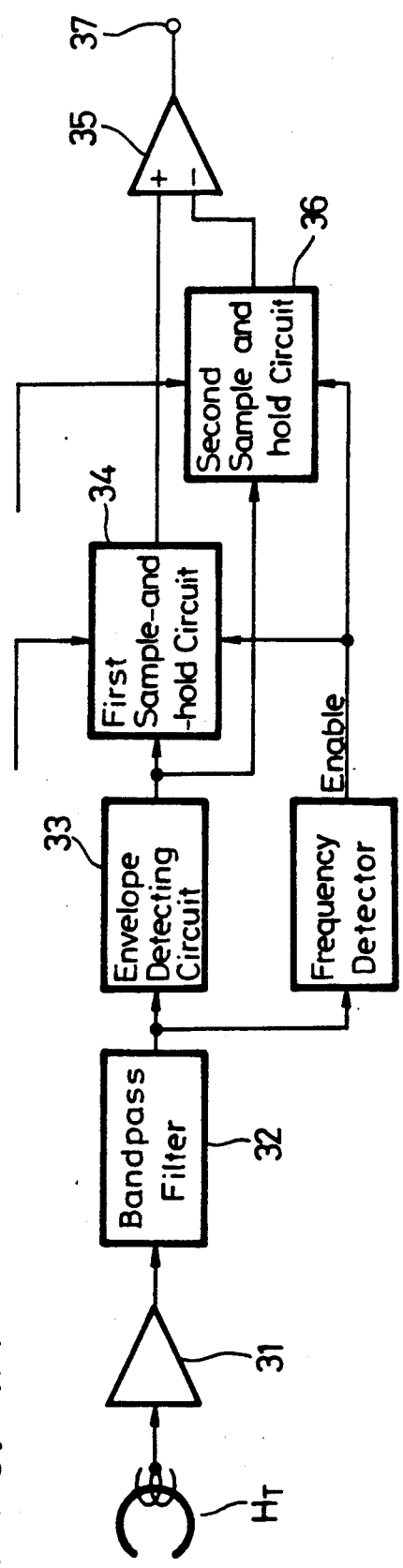
FIG. 7A is an alternate embodiment of the circuitry of FIG. 7.
Figure 7:
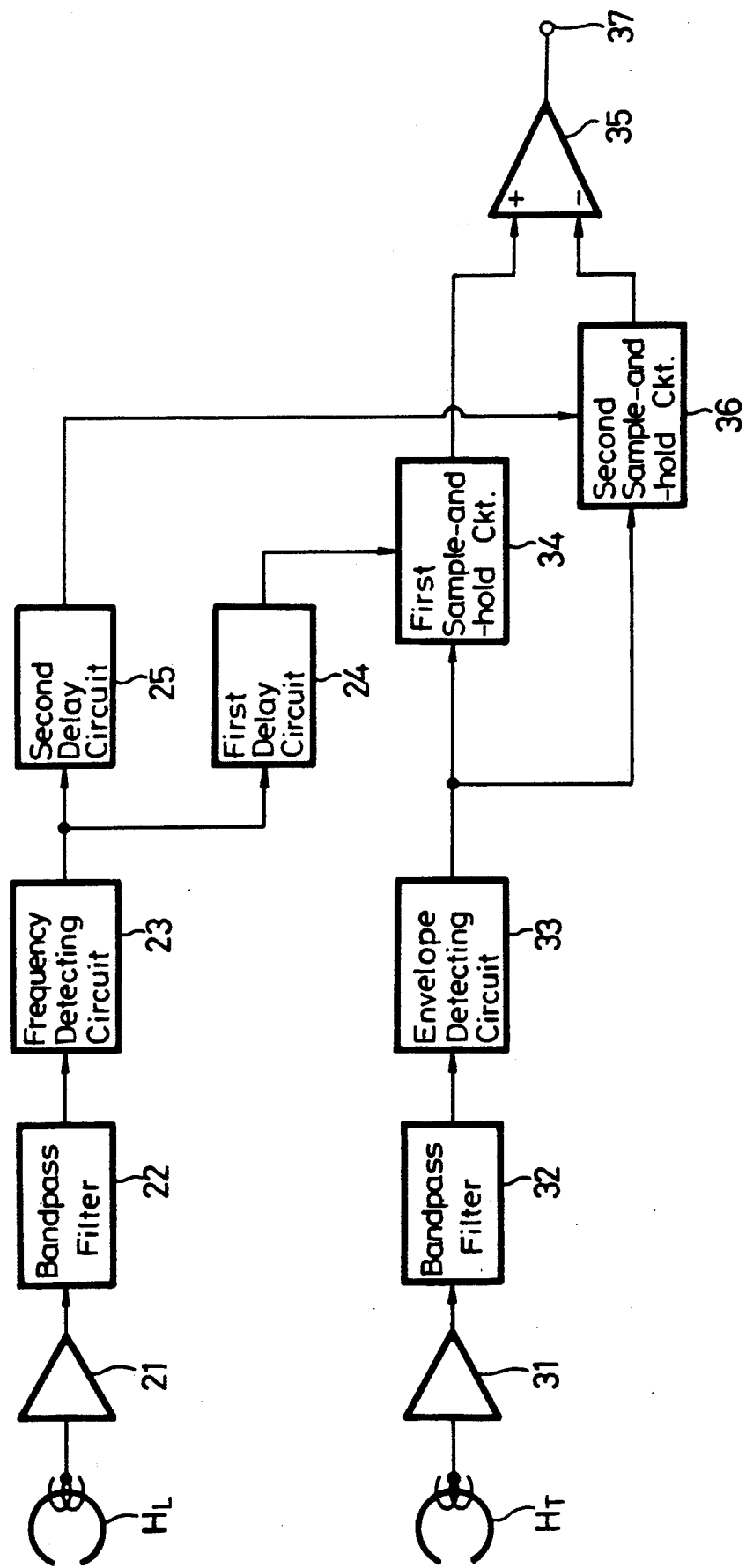
FIG. 7 is a block diagram of another embodiment of circuitry used to detect a tracking error when the track pattern shown in FIG. 3 is scanned.

Another embodiment for producing a tracking control signal is illustrated in FIG. 7, wherein those elements which are similar to the elements described previously in conjunction with FIG. 5 are identified with the same reference numerals. It is appreciated that the embodiment shown in FIG. 7 differs from that shown in FIG. 5 to the extent that sample-and-hold circuit 36 is coupled to envelope detector 33 and responds to the sampling pulse shown in FIG. 6D to sample the level of the cross talk tracking information signal produced by the envelope detector at the time that trailing head $H_T$ reaches position $t_2$. Comparator 35 is coupled to sample-and-hold circuits 34 and 36 to produce a tracking control signal as a function of the difference between the sampled cross talk tracking information signal picked up by the trailing head at positions $t_1$ and $t_2$. Nevertheless, the circuit shown in FIG. 7 achieves substantially the same result as that shown in FIG. 5; and in both circuits, the tracking control signal is produced by comparing the level of the tracking information signal picked up from adjacent tracks at positions $t_1$ and $t_2$.

Figure 5:
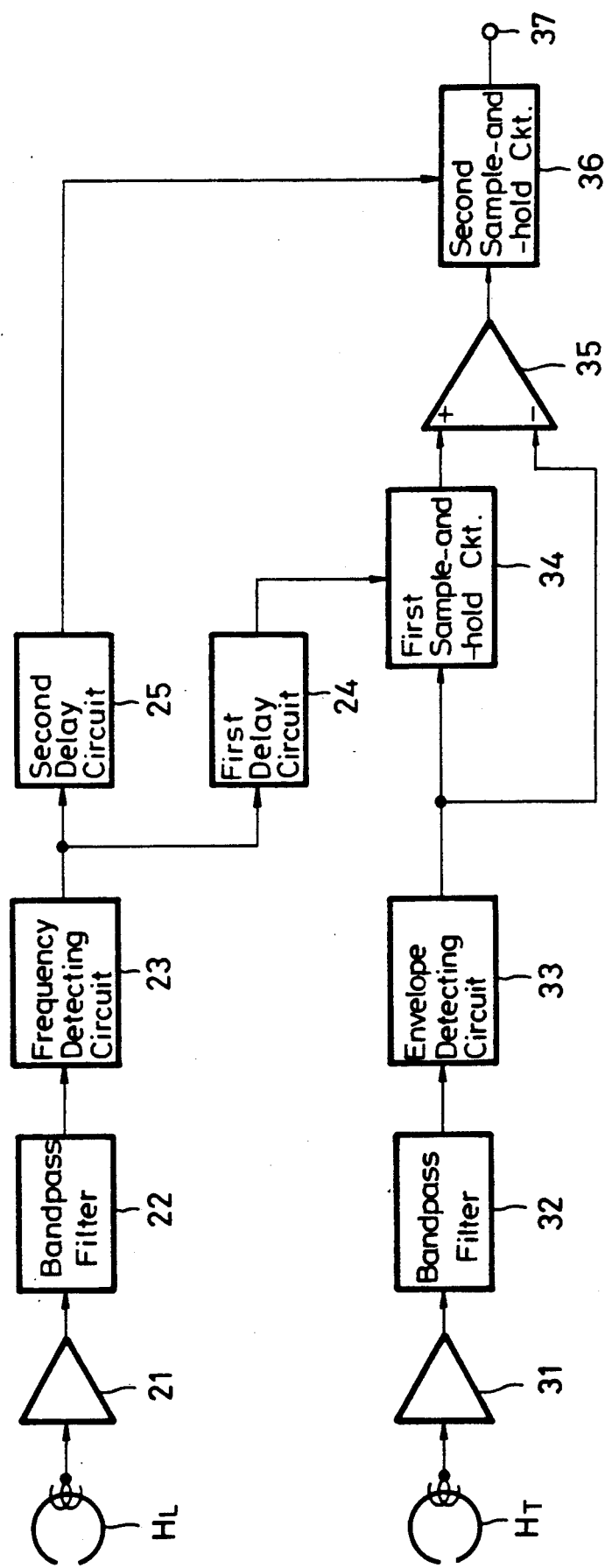
FIG. 5 is a block diagram of one embodiment of circuitry used to detect a tracking error when the track pattern shown in FIG. 3 is scanned.

In both FIGS. 5 and 7, it is seen that sample-and-hold circuits 34 and 36 are supplied with the sampling pulses shown in FIGS. 6C and 6D, respectively, at those times when trailing head $H_T$ picks up cross talk tracking information signals, or cross talk pilot signals, from only one adjacent track. Thus, the level of the pilot signal picked up from one adjacent track may be compared to the level of the pilot signal picked up from the other adjacent track. Any difference between the cross talk pilot signal levels is a function of the tracking error of the heads. As before, this tracking error may be corrected by controlling the manner in which tape 11 is transported.

Although FIG. 3 illustrates tracking information signals recorded at the beginning portion of each track, it is appreciated that the tracking information signals may be recorded at any other desired position and, moreover, two or more, or even several, discrete areas of tracking information signals may be provided in alternate tracks $L_1$, $L_2$, etc. For example, a pilot signal may be recorded in advance of, following, or in the middle of the data area.

Figure 8:
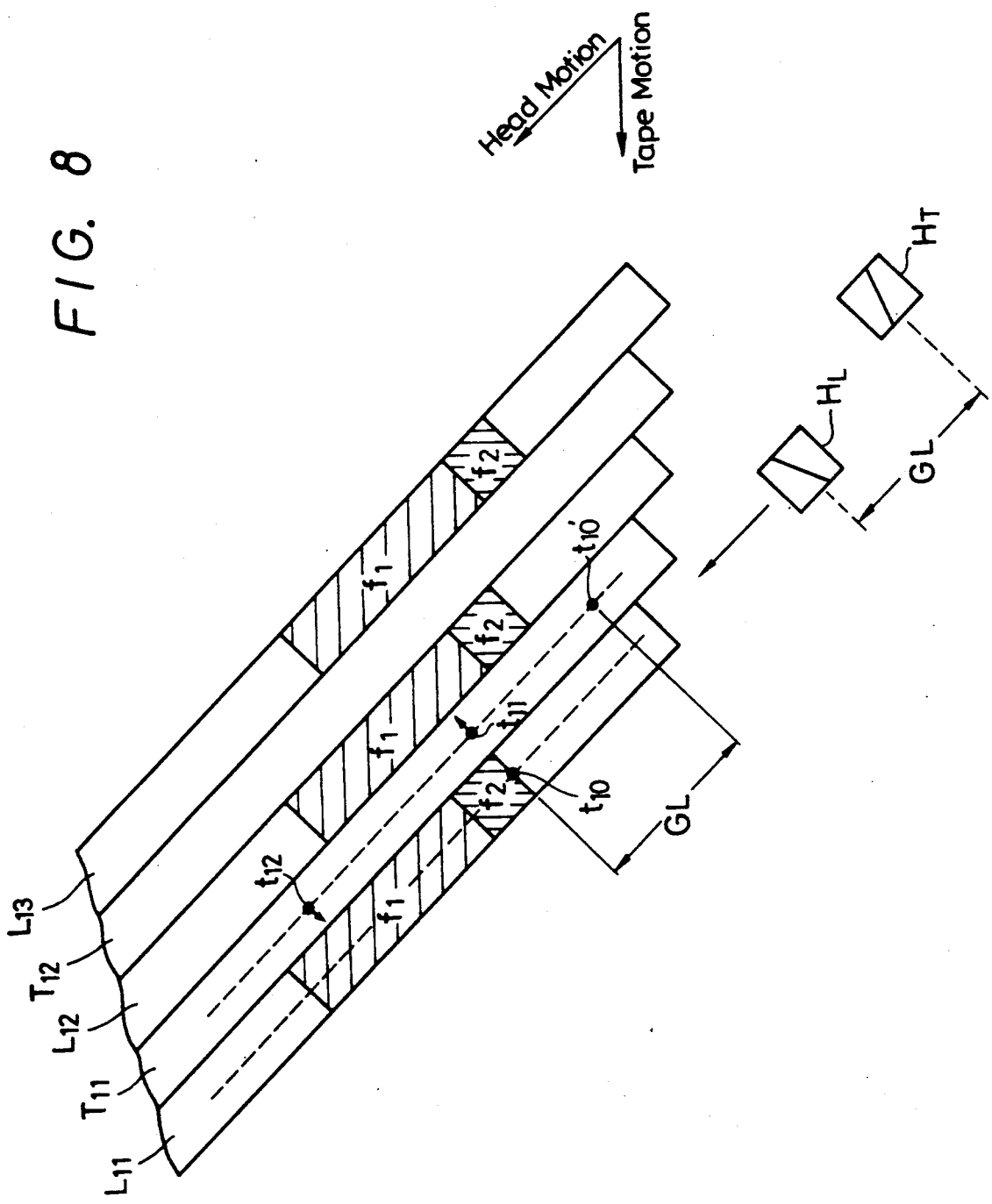
FIG. 8 is a schematic representation of yet another track pattern which may be used to detect tracking errors in accordance with the teachings of the present invention.

FIG. 8 illustrates yet another embodiment of a track pattern which may be used in accordance with the teachings of the present invention. The embodiment shown in FIG. 8 differs from that shown in FIG. 3 in that those tracks which contain the pilot signal $f_1$, that is, leading tracks $L_{11}$, $L_{12}$, etc., also contain a synchronizing signal of frequency $f_2$. The synchronizing signal frequency $f_2$ preferably is greater than the pilot signal frequency $f_1$ such that any cross talk component that may be picked up by, for example, trailing head $H_T$ suffers from azimuth loss and is substantially attenuated. Thus, it is appreciated that the synchronizing signal is recorded with the same azimuth as used to record the pilot signal and the digital data signals.

The circuitry shown in FIGS. 5 and 7 may be used with the track pattern shown in FIG. 8; and bandpass filter 22 and frequency detector 23 preferably are tuned to pass and detect the synchronizing signal of frequency $f_2$. The synchronizing signal $f_2$ is used to establish a reference from which the sampling pulses supplied to sample-and-hold circuits 34 and 36 are generated.

For example, when leading head $H_r$ reaches the position $t_{10}$, trailing head $H_T$ is at the position $t'_{10}$. At position $t_{10}$, leading head $H_L$ detects the synchronizing signal $f_2$, resulting in the generation of the pulse shown in FIG. 6B by frequency detector 23. As before, this detection pulse is delayed by delay time $t_a$ which corresponds to the time that trailing head $H_T$ reaches position $t_{11}$. At that time, pilot signal $f_1$ in adjacent track $L_{12}$ is sampled. Thereafter, at a further delayed time $t_b$, trailing head $H_T$ reaches position $t_{12}$, at which time the level of the pilot signal $f_1$ picked up from adjacent track $L_{11}$ is sensed.

Thus, it is seen that the embodiment of FIG. 8 operates in much the same way as that of FIG. 3, except that synchronizing signal $f_2$ is used to establish the reference from which the sampling pulses are generated at delayed times. The use of an additional synchronizing frequency $f_2$ in FIG. 8 adds little additional complexity to the recording circuitry used to produce the illustrated track pattern. However, since frequencies $f_1$ and $f_2$ are discrete and are recorded at different times, optimum frequencies may be selected easily and without requiring expensive or complicated circuitry. Nevertheless, the advantages discussed above in conjunction with FIG. 3 are attained by the track pattern illustrated in FIG. 8. In addition, by sensing synchronizing frequency $f_2$, which may exhibit a frequency capable of prompt detection, an accurate timing reference may be established from which the delayed sampling pulses are generated.

Figure 9:
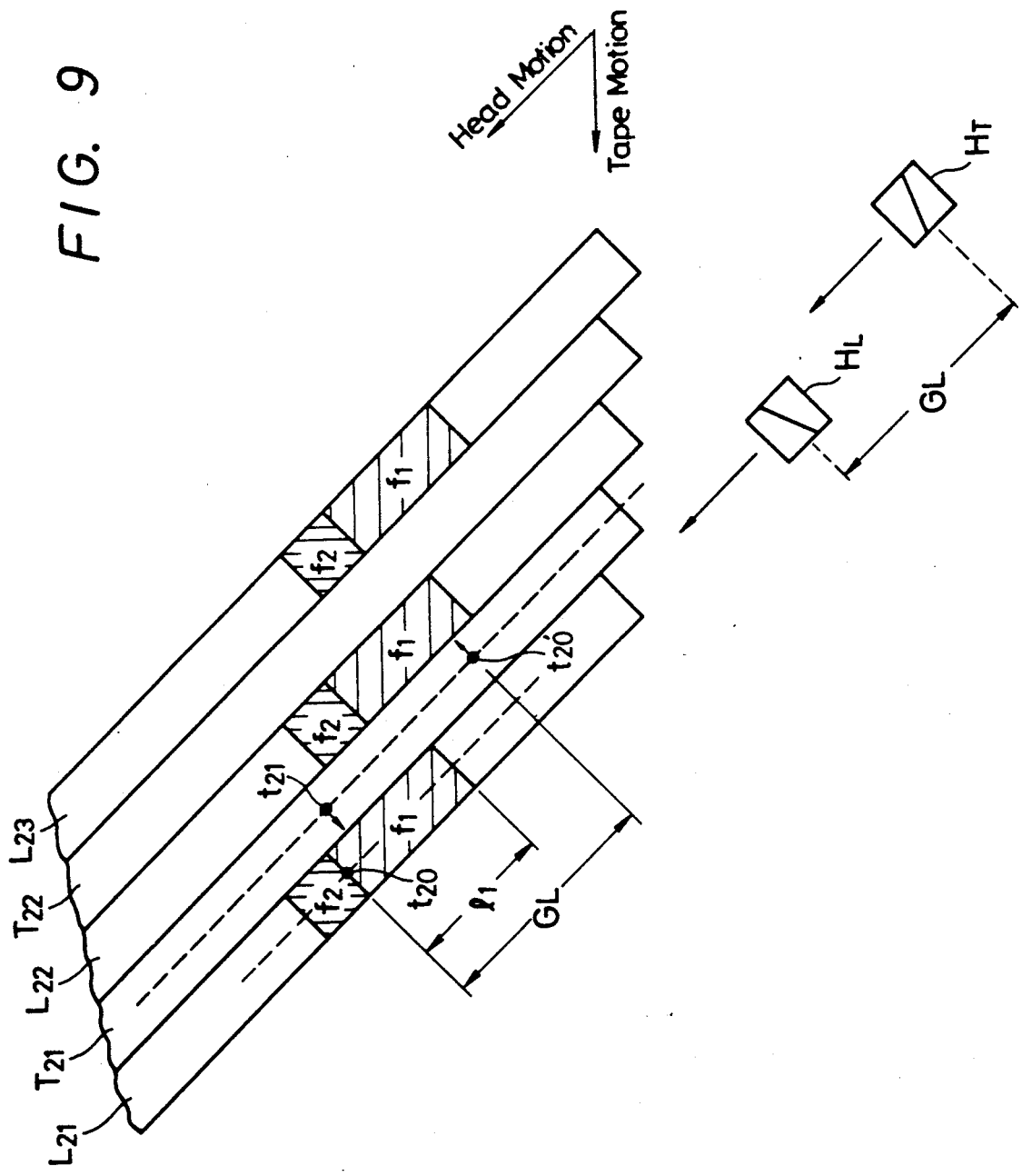
FIG. 9 is a further alternative of a track pattern which may be used to detect tracking errors in accordance with the teachings of the present invention.

Turning now to FIG. 9, there is illustrated a track pattern which is a modification of the track pattern shown in FIG. 8. The differences between the FIGS. 8 and 9 track patterns lie primarily in the positioning of the synchronizing signal $f_2$ relative to the pilot signal $f_1$ in the alternate tracks $L_{21}$, $L_{22}$, etc., in which the tracking information signals are recorded. In FIG. 8, the synchronizing signal is recorded in leading position relative to the pilot signal; and in FIG. 9 the synchronizing signal is recorded in lagging position relative to the pilot signal. Nevertheless, in the FIG. 9 embodiment, detection of the synchronizing signal $f_2$ is used to establish a reference from which the sampling signals used by the circuitry shown in FIGS. 5 and 7 are generated.

Another observable difference in the track patterns of FIGS. 8 and 9 is that the longitudinal dimension, or length $l_1$ of the area in which pilot signal $f_1$ is recorded in FIG. 9 is less than the displacement GL between the leading and trailing heads. This means that when leading head $H_L$ reaches position $t_{20}$ at the beginning of the synchronizing signal $f_2$ in scanning track $L_{21}$, trailing head $H_T$ reaches position $t'_{20}$ opposite the pilot signal $f_1$ recorded in track $L_{22}$ adjacent track $T_{21}$ scanned by the trailing head. At this position $t'_{20}$, cross talk pilot signal $f_1$ will be picked up by trailing head $H_T$ only from adjacent track $L_{22}$ and not from adjacent track $L_{21}$. This is because the pilot signal is not recorded in track $L_{21}$ adjacent position $t'_{20}$. If, however, the length $l_1$ of the area in which pilot signal $f_1$ is recorded in track $L_{21}$ is greater than displacement GL, it is possible that when leading head $H_L$ reaches position $t_{20}$ (and, thus, trailing head $H_T$ reaches position $t'_{20}$), pilot signals will be recorded in both tracks $L_{21}$ and $L_{22}$ on opposite sides of trailing head $H_T$. Consequently, the level of the cross talk pilot signal which is picked up by the trailing head would include a component from adjacent track $L_{22}$ as well as a component from adjacent track $L_{21}$ and, thus, the detection of the level of this cross talk pilot signal will not provide an accurate indication of any deviation of trailing head $H_T$ from the center line of track $T_{21}$. But, by limiting the length $l_1$ of the area in which the pilot signal is recorded, head $H_T$ picks up the cross talk pilot signal from only one adjacent track when head $H_L$ reaches position $t_{20}$ (and head $H_T$ reaches position $t'_{20}$).

Of course, at a predetermined following the sensing of synchronizing signal $f_2$ by head $H_L$, trailing head $H_T$ reaches position $t_{21}$ whereat the pilot signal $f_1$ is recorded in only one track adjacent the trailing track $T_{21}$ (i.e. only in adjacent track $L_{21}$). Thus, when the track pattern shown in FIG. 9 is used with the tracking control circuitry shown in FIGS. 5 and 7, the level of the cross talk pilot signal picked up from adjacent track $L_{22}$ at position $t'_{20}$ is compared to the level of the cross talk pilot signal picked up from adjacent track $L_{21}$ at position tracking error of heads $H_L$ and $H_T$. It is recognized that, when used with the FIG. 9 track pattern, the delay imparted by delay circuit 24 following the detection by head $H_L$ of synchronizing signal $f_2$ is minimal.

Figure 10:
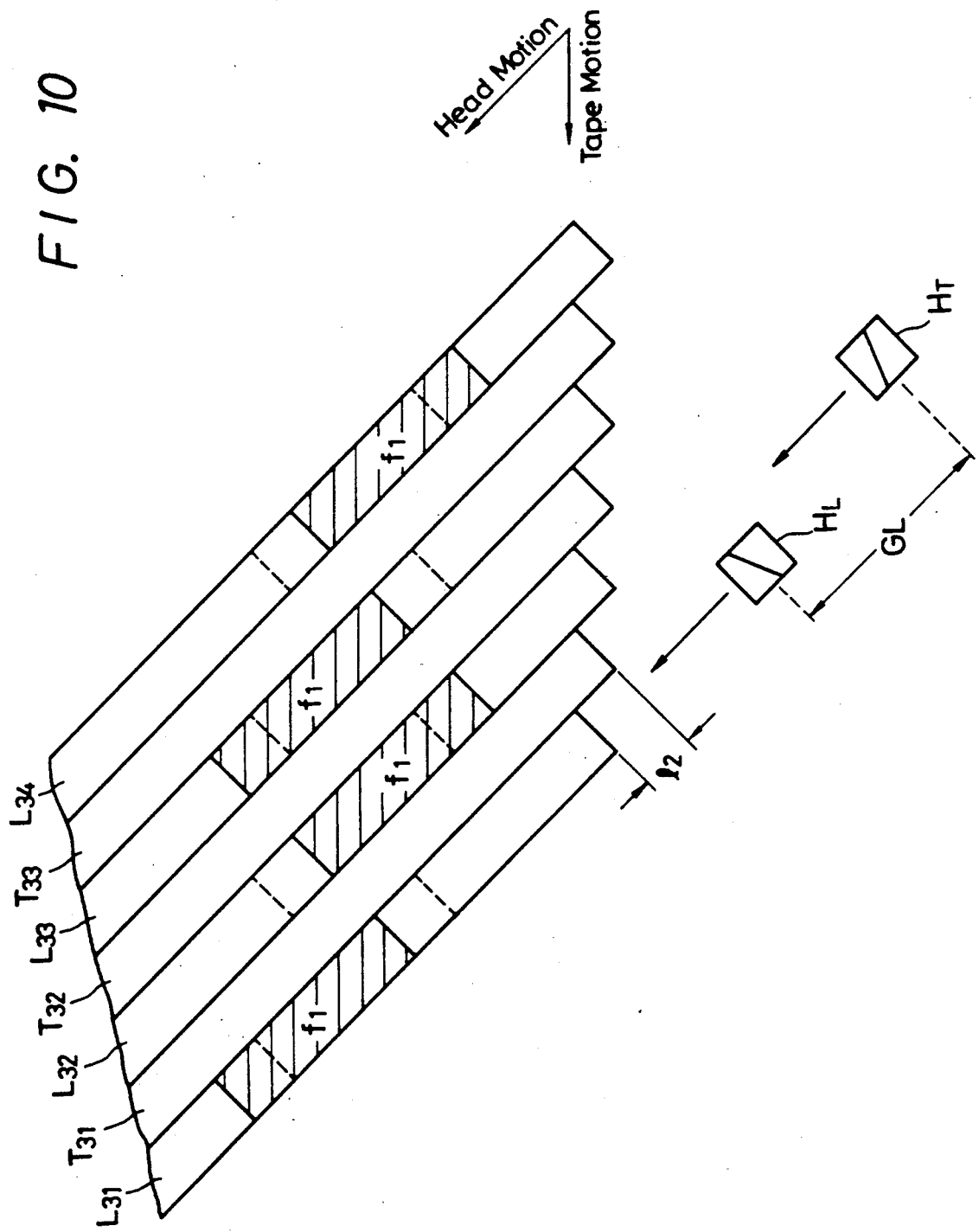
FIG. 10 is a schematic representation of a still further track pattern which may be used to detect tracking errors in accordance with the teachings of the present invention.

Yet another track pattern that may be used with the present invention is illustrated in FIG. 10. Like the patterns described above, tracking information signals are recorded in alternate tracks $L_{31}$, $L_{32}$, etc., as pilot signals $f_1$. Preferably, the pilot signals are recorded in areas having substantially equal length; but because of minor irregularities during a recording operation, the pilot signals may not be recorded in precisely the same location in each track. Rather, the pilot signals may be recorded in areas which are shifted longitudinally, as indicated by the overlap between the cross-hatched section (which represents the recorded pilot signal) and the broken lines (which represent the same given location in each track). Thus, the pilot signals are displaced longitudinally forward and backward in those tracks in which they are recorded.

It is appreciated that the tape speed and the rotary speed of heads $H_L$ and $H_T$ are such that the beginning of each track appears to be shifted from the beginning of its preceding track by only a relatively small amount $l_2$. Nevertheless, the length of the area in which each pilot signal is recorded is sufficient to assure good detection of a cross talk pilot signal that may be picked up by trailing head $H_T$ when the trailing head scans the respective trailing tracks $T_{31}$, $T_{32}$, etc.

Because of the forward and backward displacement of the pilot signals $f_1$ recorded in tracks $L_{31}$, $L_{32}$, etc., the pilot signal recorded in track $L_{32}$ (which is displaced backward) may be aligned with and substantially parallel to the pilot signal recorded in track $L_{33}$ (which is displaced forward). As a result, when trailing head $H_T$ scans track $T_{32}$, it may pick up cross talk pilot signal components concurrently from tracks $L_{32}$ and $L_{33}$, both adjacent track $T_{32}$. Such concurrent cross talk pick up of the pilot signal does not occur when head $H_T$ scans track $T_{31}$ because the pilot signals $f_1$ are shifted longitudinally with respect to each other in adjacent tracks $L_{31}$ and $L_{32}$, as illustrated. Whereas the level of the cross talk pilot signal picked up from one adjacent track can be compared to the level of the cross talk pilot signal picked up at a later time from the other adjacent track when head $H_T$ scans track $T_{31}$, thus providing an indication of the deviation of the head from the center line of track $T_{31}$, such comparison is not easily attained when the head scans track $T_{32}$. That is, the cross talk pilot signal which is picked up by head $H_T$ when track $T_{32}$ is scanned cannot be allocated accurately to track $L_{33}$ or to track $L_{32}$. Accordingly, the tracking control circuitry shown in FIGS. 5 and 7 may be modified such that only one sampling operation is carried out for ever other track scan. That is, when head $H_T$ scans track $T_{31}$ the aforedescribed sampling operation is performed by the control circuitry, whereby the level of the pilot signal picked up from track $L_{32}$ is compared to the level of the pilot signal picked up from track $L_{31}$. But, when head $H_T$ scans track $T_{32}$, sample-and-hold circuits 35 and 36 are inhibited and cross talk pilot signals picked up from tracks $L_{33}$ and $L_{32}$ are not sampled.

Although not shown in FIG. 10, tracking information signals may be recorded in alternate tracks following the data area, whereby tracking control signals are produced before the data area is scanned (as is the case in the illustrated track pattern) and tracking control signals also are produced after the data areas are scanned.

Figure 11:
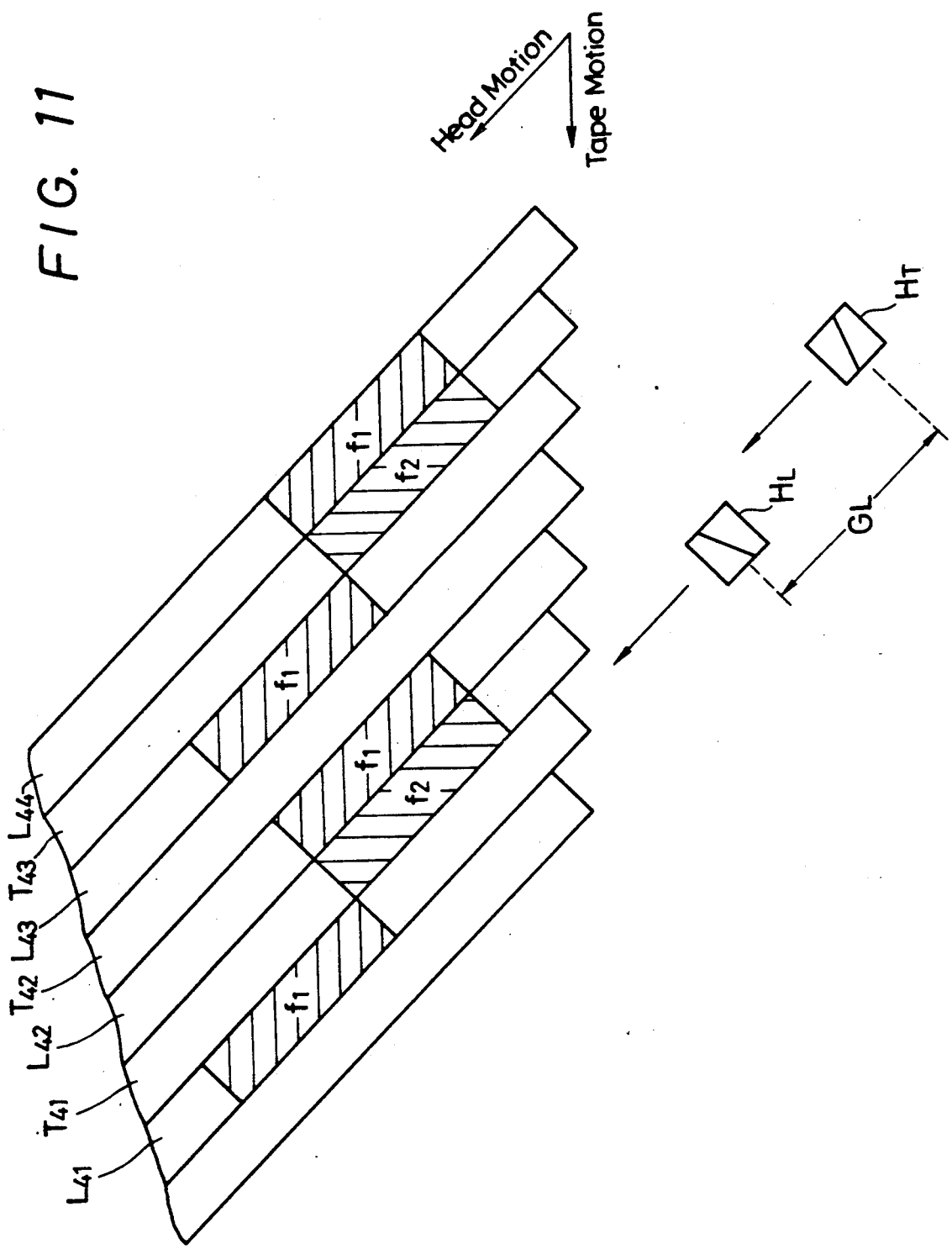
FIG. 11 is a schematic representation of still another track pattern which may be used to detect tracking errors in accordance with the teachings of the present invention.

Yet another track pattern that may be used with the present invention is illustrated in FIG. 11. This pattern is seen to be quite similar to that discussed above in conjunction with FIG. 10; and additionally includes synchronizing signals $f_2$ recorded in selected ones of the trailing tracks. More particularly, if the pilot signal $f_1$ may be thought of as being recorded in successive leading tracks $L_{41}$, $L_{42}$, $L_{43}$, etc., the synchronizing signals $f_2$ may be thought of as being recorded in alternate trailing tracks $T_{41}$, $T_{43}$, etc. Furthermore, the synchronizing signals are recorded parallel to and in alignment with the pilot signal $f_1$ recorded in a track adjacent thereto. As seen from FIG. 11, synchronizing signal $f_2$ recorded in trailing track $T_{41}$ is aligned with pilot signal $f_1$ recorded in adjacent leading track $L_{42}$. Likewise, synchronizing signal $f_2$ recorded in trailing track $T_{43}$ is in alignment with the pilot signal $f_1$ recorded in adjacent leading track $L_{44}$. It is appreciated that the synchronizing signals are recorded at the same time that the pilot signals are recorded, as when heads $H_T$ and $H_L$ scan their respective tracks.

When the track pattern shown in FIG. 11 is used with the present invention, the detection of the synchronizing signal f2 by trailing head $H_T$ serves to identify the track being scanned (as mentioned above, only alternate ones of the trailing tracks contain the synchronizing signal). Furthermore, the times at which the sampling pulses are generated may be referenced to the time at which trailing head $H_T$ detects synchronizing signal $f_2$. For example, a pulse similar to the detection pulse shown in FIG. 6B may be produced when the synchronizing signal is detected; and then the sampling pulses shown in FIGS. 6C and 6D may be produced at times $t_a$ and $t_b$ following this detection pulse. Consequently, when head $H_T$ scans track $T_{41}$, the level of the cross talk pilot signal picked up from track $L_{42}$ is sensed at the time t following the detection of synchronizing signal $f_2$, and the level of the cross talk pilot signal picked up from track $L_{41}$ is sensed at the later time $t_b$. By comparing the sensed levels of the cross talk pilot signals picked up from adjacent tracks $L_{42}$ and $L_{41}$, the deviation of head $H_T$ and, thus, the deviation of head $H_L$, from the center line of the track being scanned thereby may be determined.

Figure 5A:
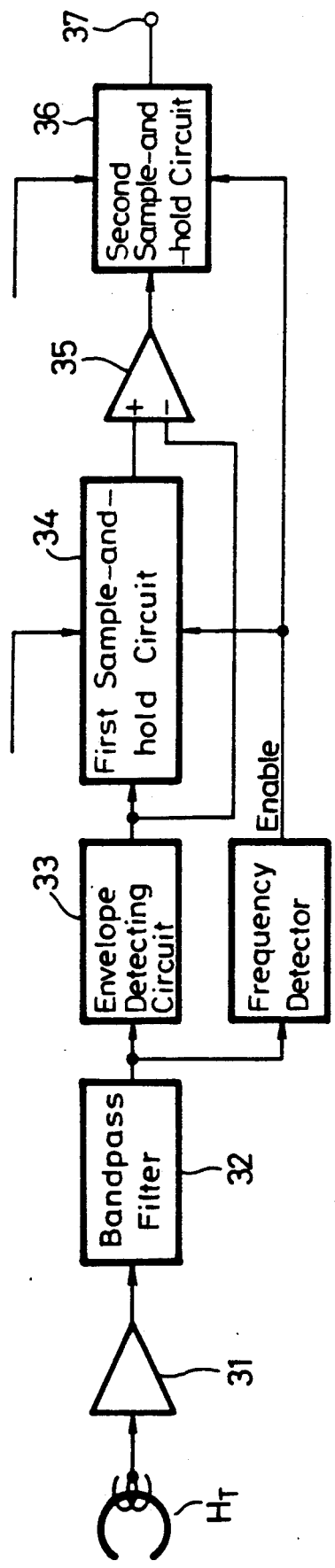
FIG. 5A is an alternate embodiment of the circuitry of FIG. 5.

Of course, when head $H_T$ scans track $T_{42}$ in which no synchronizing signal is recorded, this track is identified by the absence of such a synchronizing signal. It is appreciated that the scanning of track $T_{42}$ by head $H_T$ is substantially the same as the aforedescribed scanning of track $T_{32}$ by head $H_T$, shown in FIG. 10. Accordingly, when track $T_{42}$ is scanned, tracking errors may be determined in the same manner as has been discussed previously. In the interest of brevity, the description set forth in conjunction with FIG. 10 is not repeated here. However, the tracking control circuitry shown in FIGS. 5 and 7 may be modified to accommodate the track patterns shown in FIG. 11 as follows: A frequency detector may be coupled to the output of band pass filter 32 to detect when head $H_T$ senses the synchronizing signal $f_2$, and the detection of this synchronizing signal then may be used to enable the aforedescribed operation of sample-and-hold circuits 34 and 36 as shown in FIGS. 5A and 7A. In the absence of detecting the synchronizing signal $f_2$, as when head $H_T$ scans track $T_{42}$, one or the other, or both, sample-and-hold circuits may be inhibited from carrying out a new sampling operation and the previously sampled pilot signal may be reused. For example, the previously sampled difference in the pilot signals picked up from tracks $L_{42}$ and $L_{41}$ may be used once again to control tracking when tracks $T_{42}$ and $L_{42}$ are scanned.

Figure 12:
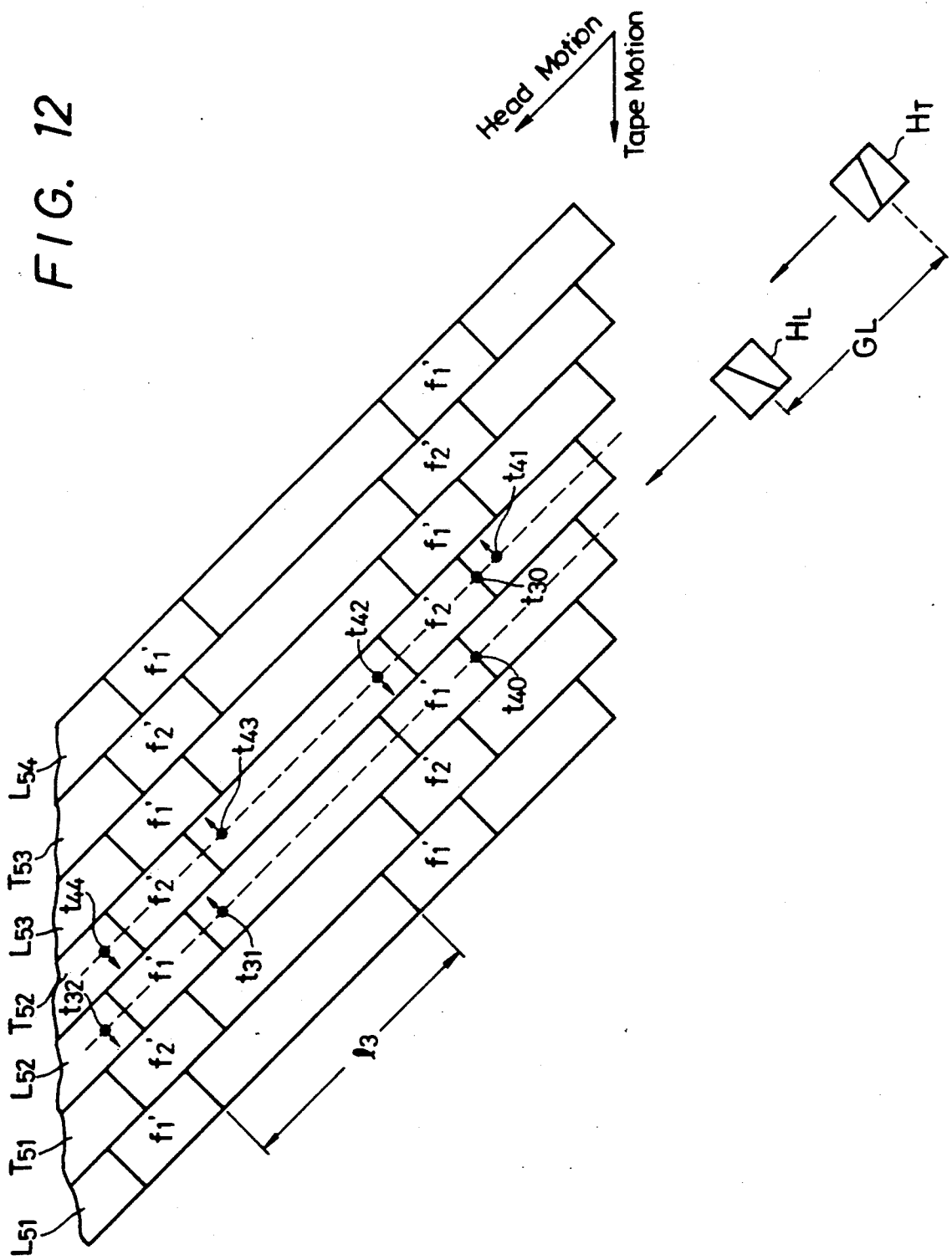
FIG. 12 is a schematic representation of yet a further track pattern which may be used to detect tracking errors in accordance with the teachings of the present invention.

A still further example of a track pattern that may be used in accordance with the teachings of the present invention is illustrated in FIG. 12. In this example, pilot signals are recorded in successive tracks $L_{51}$, $T_{51}$, $T_{52}$, and so on. Furthermore, the pilot signal is recorded in two discrete areas in each track, those two areas being longitudinally spaced apart by a predetermined interval $l_3$. The pilot signal recorded by leading head $H_L$ admits of a frequency $f'_1$ and the pilot signal recorded by trailing head $H_T$ admits of a frequency $f'_2$. These frequencies are such that they are not significantly attenuated by azimuth loss and, thus, the pilot signal recorded with the azimuth of one head may be picked up as a cross talk pilot signal by the other head.

When the tracking control circuits shown in FIGS. 5 and 7 are used to scan the tracks having the recorded track pattern shown in FIG. 12, the sensing by leading head $H_L$ of the pilot signal $f'_1$ in, for example, track $L_{52}$ occurs at position $t_{40}$. At a predetermined time following the detection of this pilot signal, trailing head $H_T$ arrives at position $t_{41}$ along track $T_{52}$. The level of the cross talk pilot signal $f'_1$ picked up by head $H_T$ from adjacent track $L_{53}$ is sensed at this time; and at a later time head $H_T$ reaches position $t_{42}$ and the level of the cross talk pilot signal $f'_1$ picked up from adjacent track $L_{52}$ is sensed and compared to the previously sensed pilot signal level. As is appreciated from the description of FIGS. 5 and 7, any difference between the sensed cross talk pilot signal levels is indicative of a tracking error of the heads.

In accordance with the preceding description, the sensing of pilot signal $f'_1$ by leading head $H_L$ is used to establish time delays for generating sampling pulses when head $H_T$ reaches positions $t_{41}$ and $t_{42}$, respectively. Alternatively, since pilot signals are recorded in two separate spaced apart locations along each track, the sensing of pilot signal $f'_1$ by leading head $H_L$ may establish time delays for generating sampling pulses when trailing head $H_T$ reaches positions $t_{43}$ and $t_{44}$, respectively. Thus, rather than sensing the cross talk pilot signals at the leading edge of interval $l_3$, the timing relationship established by the sensing of pilot signal $f'_1$ by head $H_L$ may result in the sensing of the cross talk pilot signals recorded at the trailing edge of interval $l_3$.

In the foregoing description of FIG. 12, pilot signals $f'_1$ are sensed by leading head $H_L$ to establish the proper timing relationship at which sampling pulses are generated, and these pilot signals are detected as cross talk components by trailing head $H_T$ to determine tracking error. Alternatively, pilot signals $f'_2$ may be detected for the same purpose. For example, when head $H_T$ scans track $T_{52}$, the sensing of pilot signal $f'_2$ at position $t_{30}$ generates a detection pulse such as that shown in FIG. 6B. At a later time $t_a$, leading head $H_L$ reaches position $t_{31}$ in adjacent track $L_{52}$. The leading head now is opposite pilot signal $f'_2$ in adjacent track $T_{52}$; and the sampling pulse shown in FIG. 6C is generated to sense the level of the cross talk pilot signal $f'_2$. At a later time $t_b$, leading head $H_L$ reaches position $t_{32}$ opposite pilot signal $f'_2$ in adjacent track $T_{51}$. Now, the sampling pulse shown in FIG. 6D is generated such that the level of the cross talk pilot signal $f'_2$ in track $T_{51}$ is sensed and compared to the previously sensed cross talk pilot signal. Any difference therebetween is indicative of the tracking error of head $H_L$.

Thus, when the track pattern shown in FIG. 12 is used, pilot signals $f'_1$ or pilot signals $f'_2$ may be used to establish the proper timing relationship for sensing level differences between cross talk pilot signals, thus providing an indication of tracking errors. Alternatively, an accurate tracking error indication may be provided by carrying out the sampling and comparison operation when heads $H_L$ and $H_T$ scan the pilot signals which precede interval $l_3$ and also when the heads scan the pilot signals that follow the interval $l_3$. For example, when head $H_L$ reaches position $t_{40}$, the pilot signals picked up by head $H_T$ at positions $t_{41}$ and $t_{42}$ may be sensed and compared. While head $H_T$ scans track $T_{52}$, for example, its arrival at position $t_{30}$ may be used to sense the level of the cross talk pilot signal $f'_2$ picked up by head $H_L$ when the latter head reaches positions $t_{31}$ and $t_{32}$, respectively. Thus, as the illustrated segment of tape is scanned, two separate tracking error detecting operations are carried out, one by the picking up of cross talk pilot signals by head $H_T$ and the other by the picking up of cross talk pilot signals by head $H_L$.

While the present invention has been particularly shown and described with reference to preferred embodiments, it will be readily appreciated by those of ordinary skill in the art that various changes and modifications may be made without departing from the spirit and scope of the invention. For example, this invention has been described in the environment of rotary heads used to scan slant tracks across magnetic tape. The teachings of this invention are equally applicable to stationary heads which scan parallel circular tracks on a record medium, such as tracks on a magnetic or optical disk. In magnetic and optical disk devices, servo mechanisms are used to detect and correct tracking errors. The present invention may be employed with such servo mechanisms.

It is intended that the appended claims be interpreted as covering the embodiments described herein and all equivalents thereto.

What is claimed is:

1. Apparatus for producing tracking control signals indicative of a tracking error of transducer means scanning data tracks on a record medium, at least alternate ones of said tracks containing tracking information signals recorded in predetermined areas, said apparatus comprising: first and second heads included in said transducer means, said first and second heads being offset from each other in a direction substantially transverse of said tracks and being displaced from each other in a direction substantially parallel to said tracks; sensing means for sensing the level of tracking information signals picked up by one of said heads; timing means responsive to tracking information signals picked up by the other of said heads for establishing times at which said tracking information signal level is sensed; and output means responsive to the sensed tracking information signal level to produce a tracking control signal.

2. The apparatus of claim 1 wherein said sensing means comprises a first sensor operable at a first time to sense a tracking information signal picked up by said one head from a first track adjacent the track being scanned by said one head, a second sensor operable at a second time to sense the difference between the tracking information signal sensed at said first time and a tracking information signal picked up by said one head from a second track adjacent the track being scanned by said one head; and said timing means is operable to establish said first and second times.

3. The apparatus of claim 2 wherein said second sensor includes comparator means for comparing the tracking information signals sensed at said first and second times to produce a tracking control signal as a function of the difference therebetween.

4. The apparatus of claim 3 wherein said timing means comprises sampling pulse generating means for generating sampling pulses at said first and second times.

5. The apparatus of claim 4 wherein said sampling pulse generating means comprises delay means for generating said sampling pulses at said first and second times following the detection of a tracking information signal picked up by said other head.

6. The apparatus of claim 4 wherein said first sensor comprises first sample-and-hold means responsive to a sampling pulse at said first time to sample the tracking information signal picked up from said first track; and said second sensor comprises comparator means for comparing the sampled tracking information signal to the tracking information signal picked up from said second track, and second sample-and-hold means responsive to a sampling pulse at said second time to sample the difference produced by said comparator means.

7. The apparatus of claim 4 wherein said first sensor comprises first sample-and-hold means responsive to a sampling pulse at said first time to sample the tracking information signal picked up from said first track; and said second sensor comprises second sample-and-hold means responsive to a sampling pulse at said second time to sample the tracking information signal picked up from said second track, and comparator means for comparing the samples produced by said first and second sample-and-hold means.

8. The apparatus of claim 4 wherein said tracking information signals include synchronizing signals and pilot signals, said synchronizing signals being picked up by said other head; and wherein said sampling pulse generating means comprises means for generating said sampling pulses at first and second predetermined times following detection of said synchronizing signals.

9. The apparatus of claim 8 wherein said synchronizing signals are recorded in leading relation to said pilot signals.

10. The apparatus of claim 8 wherein said synchronizing signals are recorded in trailing relation to said pilot signals.

11. The apparatus of claim 4 further including synchronizing signals recorded in alternate ones of those tracks which do not contain tracking information signals, said synchronizing signals being picked up by said one head; and wherein said sampling pulse generating means comprises means for generating said sampling pulses at first and second predetermined times following detection of said synchronizing signals.

12. The apparatus of claim 1 wherein said sensing means comprises a sensor actuable to sense a tracking information signal picked up by said one head from a track adjacent the track scanned by said one head; sampling means for sampling the signal picked up by said one head at a sampling time referenced to the detection of tracking information signals picked up by said other head, thereby producing a sampled signal; and level sensing means for sensing the level of said sampled signal and for producing said tracking control signal as a function of the sensed level.

13. The apparatus of claim 1 wherein said data tracks are slant tracks across said record medium; and said first and second heads comprise rotary heads, a rotary drum for supporting said heads and for rotating same across said record medium, said heads being spaced apart in the axial direction of said drum and angularly displaced form each other in the rotational direction of said drum.

14. The apparatus of claim 1 wherein the offset of said first and second heads is substantially equal to the pitch of said data tracks.

15. The apparatus of claim 1 wherein at least one of said first and second heads exhibits a width greater than the width of the tracks scanned thereby.

16. A method for producing tracking control signals in response to the scanning of data tracks on a record medium, at least alternative ones of said tracks containing tracking information signals recorded in predetermined areas, said method comprising the steps of: scanning said tracks with first and second heads offset from each other in a direction substantially transverse of said tracks and displaced from each other in a direction substantially parallel to said tracks such that said tracks and displaced from each other in a direction substantially parallel to said tracks such that said first and second heads scan two tracks concurrently over the major portion of a scanning trace of each head; detecting the level of tracking information signals picked up by one of said heads at times established in response to tracking information signals picked up by the other of said heads during a scanning trace; and producing a tracking control signal indicative of a tracking error of said first and second heads relative to the tracks being scanned thereby in response to the detected tracking information signal level during a scanning trace.

17. The method of claim 16 wherein said step of producing a tracking control signal comprises sensing at a first time a tracking information signal picked up by said one head from a first track adjacent the track being scanned by said one head, sensing at a second time a tracking information signal picked up by said one head from a second track adjacent said track being scanned by said one head, and responding to a tracking information signal picked up by the other of said heads from the track being scanned by said other head to determine said first and second times.

18. The method of claim 17 wherein the steps of sensing at first and second times comprise sampling the tracking information signal picked up from said first and second tracks at said first and second times, respectively, with sampling pulses generated at said first and second times in response to the detected tracking information signal picked up by said other head.

19. The method of claim 18 wherein said step of producing a tracking control signal further comprises comparing the sampled tracking information signals and producing a tracking control signal as a function of the difference therebetween.

20. The method of claim 18 wherein the sampling pulses are generated by providing first and second predetermined time delays following the detection of a tracking information signal picked up by said other head to generate first and second sampling pulses, respectively.

21. The method of claim 16 wherein said step of producing a tracking control signal comprises sensing at a first time a tracking information signal picked up by said one head from a first track adjacent the track being scanned by said one head, comparing the tracking information signal picked up from said first track at said first time to the detected tracking information signal picked up by said one head, sensing at a second time any difference between the compared signals, and responding to a tracking information signal picked up by the other of said heads from the track being scanned by said other head to determine said first and second times.

22. The method of claim 16 wherein said tracking information signals include synchronizing signals and pilot signals, said synchronizing signals being picked up by said one head; and wherein said tracking control signal is produced by comparing pilot signal levels picked up by the said other head at first and second times following detection of said synchronizing signals.

23. The method of claim 22 wherein said synchronizing signals are recorded in leading relation to said pilot signals.

24. The method of claim 22 wherein said synchronizing signals are recorded in trailing relation to said pilot signals.

25. The method of claim 16 further including synchronizing signals recorded in alternate ones of those tracks which do not contain tracking information signals, said synchronizing signals being picked up by one of said heads; and wherein said tracking control signal is produced by comparing levels of tracking information signals picked up by said one head at first and second times following detection of said synchronizing signals.

26. The method of claim 16 wherein said step of producing a tracking control signal comprises sensing a tracking information signal picked up by said one head from a track adjacent the track scanned by said one head; sampling the signal picked up by said one head at a sampling time referenced to the detection of tracking information signals picked up by said one head, thereby producing a sampled signal; sensing the level of said sampled signal; and producing said tracking control signal as a function of the sensed level of said sampled signal.

27. The method of claim 16 wherein said data tracks are slant tracks across said record medium; and said first and second heads are mounted on a rotary drum, said heads being spaced apart in the axial direction of said drum and angularly displaced from each other in the rotational direction of said drum.

28. The method of claim 16 wherein the offset of said first and second heads is substantially equal to the pitch of said data tracks.

* * * * *